US011618481B2

(12) United States Patent
Chai et al.

(10) Patent No.: US 11,618,481 B2
(45) Date of Patent: Apr. 4, 2023

(54) AGENT TRAJECTORY PREDICTION USING ANCHOR TRAJECTORIES

(71) Applicant: Waymo LLC, Mountain View, CA (US)

(72) Inventors: Yuning Chai, San Mateo, CA (US); Benjamin Sapp, Marina del Rey, CA (US); Mayank Bansal, Mountain View, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 252 days.

(21) Appl. No.: 16/919,872

(22) Filed: Jul. 2, 2020

(65) Prior Publication Data

US 2021/0001897 A1 Jan. 7, 2021

Related U.S. Application Data

(60) Provisional application No. 62/870,399, filed on Jul. 3, 2019.

(51) Int. Cl.
*B60W 60/00* (2020.01)
*G06K 9/62* (2022.01)
*G06N 3/08* (2006.01)
*G06V 20/56* (2022.01)

(52) U.S. Cl.
CPC ..... *B60W 60/00274* (2020.02); *G06K 9/6256* (2013.01); *G06N 3/08* (2013.01); *G06V 20/588* (2022.01); *B60W 2554/4041* (2020.02); *B60W 2554/4044* (2020.02)

(58) Field of Classification Search
CPC .............. G05D 1/0088; G05D 1/0212; G05D 2201/0213; B60W 40/12; B60W 2520/06; B60W 2720/24
See application file for complete search history.

(56) References Cited

U.S. PATENT DOCUMENTS

| | | | |
|---|---|---|---|
| 11,195,418 B1 * | 12/2021 | Hong | G06N 3/0454 |
| 11,256,983 B2 * | 2/2022 | Ogale | G05D 1/0221 |
| 2018/0374359 A1 | 12/2018 | Bakhi | |
| 2019/0014445 A1 | 1/2019 | Cirit | |
| 2019/0025841 A1 | 1/2019 | Haynes et al. | |
| 2019/0072973 A1 | 3/2019 | Tusimple | |
| 2020/0110416 A1 * | 4/2020 | Hong | G01C 21/3602 |
| 2021/0004611 A1 * | 1/2021 | Garimella | G08G 1/0112 |

FOREIGN PATENT DOCUMENTS

WO    WO 2019/023628    1/2019

OTHER PUBLICATIONS

Alahi et al., "Social LSTM: Human Trajectory Prediction in Crowded Spaces," 2016 IEEE Conference on Computer Vision and Pattern Recognition, Jun. 2016, pp. 961-971.

(Continued)

*Primary Examiner* — Peter D Nolan
*Assistant Examiner* — Mikko Okechukwu Obioha
(74) *Attorney, Agent, or Firm* — Fish & Richardson P.C.

(57) ABSTRACT

Methods, systems, and apparatus, including computer programs encoded on computer storage media, for agent trajectory prediction using anchor trajectories.

20 Claims, 4 Drawing Sheets

(56) References Cited

OTHER PUBLICATIONS

Bansal et al., "ChauffeurNet: Learning to drive by imitating the best and synthesizing the worst," CoRR, Dec. 2018, arxiv.org/abs/1812.03079, 20 pages.

Becker et al., "Red: A simple but effective baseline predictor for the trajnet benchmark," Proceedings of the European Conference on Computer Vision (ECCV) Workshops, 2018, 16 pages.

Bhattacharyya et al., "Accurate and Diverse Sampling of Sequences Based on a "Best of Many" Sample Objective," Proceedings of the IEEE Conference on Computer Vision and Pattern Recognition, Jun. 2018, 8485-8493.

Casas et al., "Intentnet: Learning to predict intention from raw sensor data," PMLR, 2018, 87:947-956.

Chai et al., "MultiPath: Multiple Probabilistic Anchor Trajectory Hypotheses for Behavior Prediction," CoRR, Oct. 2019, arxiv.org/abs/1910.05449, 14 pages.

Cui et al. "Multimodal trajectory predictions for autonomous driving using deep convolutional networks," CoRR, Sep. 2018, arXiv:1809.10732, 2018, 7 pages.

Dosovitskiy et al., "CARLA: An Open Urban Driving Simulator," CoRR, Nov. 2017, arxiv.org/abs/1711.03938, Nov. 2017, 16 pages.

Erhan et al., "Scalable object detection using deep neural networks," Proceedings of the IEEE Conference on Computer Vision and Pattern Recognition, 2014, 8 pages.

Gupta et al., "Social gan: Socially acceptable trajectories with generative adversarial networks," Proceedings of the IEEE Conference on Computer Vision and Pattern Recognition, 2018, pp. 2255-2264.

Helbing, "Social force model for pedestrian dynamics," Phys. Rev. E., May 1995, 51(5):4282.

Hong et al., "Rules of the road: Predicting driving behavior with a convolutional model of semantic interactions," Proceedings of the IEEE/CVF Conference on Computer Vision and Pattern Recognition, 2019, pp. 8454-8462.

Ivanovic et al., "Generative modeling of multimodal multi-human behavior," 2018 IEEE/RSJ International Conference on Intelligent Robots and Systems, Oct. 2018, pp. 3088-3095.

Kendall et al., "What uncertainties do we need in bayesian deep learning for computer vision?" Advances in Neural Information Processing Systems 30, 2017, 11 pages.

Kitani et al., "Activity forecasting," ECCV 2012: Computer Vision—ECCV 2012, 2012, pp. 201-214.

Kocic et al., "An End-to-End Deep Neural Network for Autonomous Driving Designed for Embedded Automotive Platforms," Sensors, 2019, 19(9):26 pages.

Lee et al., "DESIRE: distant future prediction in dynamic scenes with interacting agents," Proceedings of the IEEE Conference on Computer Vision and Pattern Recognition, 2017, pp. 336-345.

Liu et al., "Ssd: Single shot multibox detector," ECCV 2016: Computer Vision—ECCV 2016, pp. 21-37.

Luo et al., "Fast and furious: Real time end-to-end 3d detection, tracking and motion forecasting with a single convolutional net," Proceedings of the IEEE Conference on Computer Vision and Pattern Recognition, 2018, pp. 3569-3577.

Ma et al., "Forecasting interactive dynamics of pedestrians with fictitious play," Proceedings of the IEEE Conference on Computer Vision and Pattern Recognition, 2017, pp. 774-782.

PCT International Search Report and Written Opinion in International Appln. No. PCT/US2020/040682, dated Oct. 15, 2020, 13 pages.

Pellegrini et al., "You'll never walk alone: Modeling social behavior for 319 multi-target tracking," 2009 IEEE 12th International Conference on Computer Vision, Sep. 2009, 9 pages.

Rhinehart et al., "First-person activity forecasting with online inverse reinforcement learning," Proceedings of the IEEE International Conference on Computer Vision, 2017, pp. 3696-3705.

Rhinehart et al., "Precog: Prediction conditioned on goals in visual multi-agent settings," Proceedings of the IEEE/CVF International Conference on Computer Vision, 2019, 10 pages.

Rhinehart et al., "R2p2: A reparameterized pushforward policy for diverse precise generative path forecasting," Proceedings of the European Conference on Computer Vision, 2018, pp. 17 pages.

Robicquet et al., "Forecasting social navigation in crowded complex scenes," CoRR, Jan. 2016, arXiv:1601.00998, 16 pages.

Sadeghian et al., "Car-net: Clairvoyant attentive recurrent network," Proceedings of the European Conference on Computer Vision, 2018, pp. 151-167.

Yamaguchi et al., "Who are you with and where are you going?" CVPR 2011, pp. 1345-1352.

Yang et al., "Articulated human detection with flexible mixtures of parts," IEEE Transactions on Pattern Analysis and Machine Intelligence, Dec. 2013, 35(12):2878-2890.

Zhang et al., "Deep residual learning for image recognition," Proceedings of the IEEE Conference on Computer Vision and Pattern Recognition, 2016, pp. 770-778.

International Preliminary Report on Patentability in International Appln. No. PCT/US2020/040682, dated Jan. 13, 2022, 9 pages.

Extended European Search Report in European Appln. No. 20834624.7, dated Jan. 4, 2023, 11 pages.

\* cited by examiner

AGENT TRAJECTORY PREDICTION USING ANCHOR TRAJECTORIES

CROSS-REFERENCE TO RELATED APPLICATION

This application claims priority to U.S. Provisional Application No. 62/870,399, filed on Jul. 3, 2019. The disclosure of the prior application is considered part of and is incorporated by reference in the disclosure of this application.

BACKGROUND

This specification relates to predicting the future trajectory of an agent in an environment.

The environment may be a real-world environment, and the agent may be, e.g., a vehicle in the environment. Predicting the future trajectories of agents is a task required for motion planning, e.g., by an autonomous vehicle.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification generally describes a system implemented as computer programs on one or more computers in one or more locations that predicts the future trajectory of an agent in an environment.

According to a first aspect, there is provided a system for predicting the future trajectory of an agent in a vicinity of a vehicle in an environment. The system obtains an embedding that characterizes the agent, and processes the embedding using a trajectory prediction neural network to generate a trajectory prediction output that characterizes the future trajectory of the agent after the current time point. The trajectory prediction output includes data characterizing a predicted similarity of the future trajectory of the agent to each of multiple anchor trajectories. Each anchor trajectory characterizes a possible future trajectory of the agent and includes data specifying a sequence of multiple waypoint spatial locations in the environment that each correspond to a respective future time point. The system provides the trajectory prediction output to a planning system of the vehicle to generate planning decisions that plan the future trajectory of the vehicle.

The subject matter described in this specification can be implemented in particular embodiments so as to realize one or more of the following advantages.

The system described in this specification can generate a trajectory prediction output that characterizes a predicted similarity of the future trajectory of an agent to each of multiple "anchor" trajectories. Each anchor trajectory implicitly corresponds to a possible high-level intention of the agent, e.g., to perform a U-turn, to change lanes, or to stop. For each anchor trajectory, the trajectory prediction output can further characterize uncertainty in how the agent may execute the intention corresponding to the anchor trajectory.

The system can efficiently generate the trajectory prediction output for an agent using one forward pass through a neural network model, and the trajectory prediction output can be compactly represented, e.g., by a set of probability distribution parameters. In contrast, some conventional trajectory prediction systems generate outputs that are represented by a number of parameters that is orders of magnitude greater than the number of parameters required to represent the trajectory prediction output generated by the system described in this specification. Moreover, rather than generating a single trajectory prediction output, some conventional trajectory systems repeatedly generate outputs characterizing multiple different possible future trajectories of the agent. Therefore, by generating a single compact trajectory prediction output, the system described in this specification may consume fewer computational resources (e.g., memory resources) than some conventional trajectory prediction systems.

The system described in this specification can generate trajectory prediction outputs that characterize the future trajectory of an agent more accurately than some conventional trajectory prediction systems. For example, by characterizing the inherent uncertainty in the future trajectory of the agent, the system can generate trajectory prediction outputs more accurately than some conventional systems that predict a single most-likely future trajectory of the agent. As another example, by generating trajectory prediction outputs based on a set of anchor trajectories that capture the modes of the distribution of possible future trajectories, the system can avoid "mode collapse" as experienced by some conventional systems. A conventional system that experiences mode collapse may generate multiple predicted future trajectories of the agent that differ very little from a single deterministic estimate of the future trajectory of the agent.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes how a vehicle, e.g., an autonomous or semi-autonomous vehicle, can use a trained machine learning model, referred to in this specification as a "trajectory prediction system," to generate a respective trajectory prediction output for each of one or more surrounding agents in the vicinity of the vehicle in an environment.

In this specification, a "surrounding agent" can refer, without loss of generality, to a vehicle, bicycle, pedestrian, ship, drone, or any other moving object in an environment.

This specification also describes how training examples generated by vehicles can be used to effectively train the trajectory prediction system to accurately and reliably make predictions.

Figure 1:
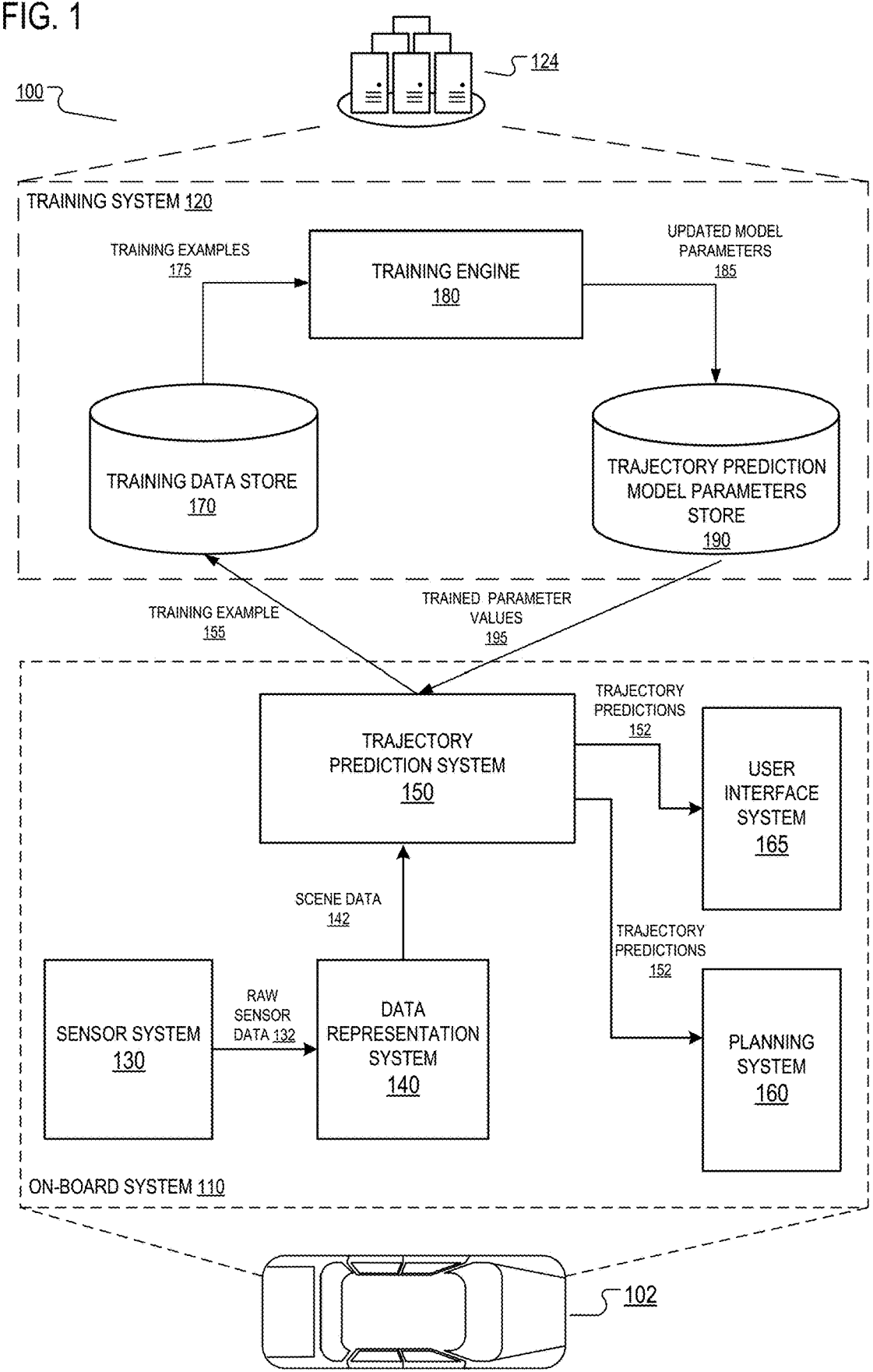
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and generates scene data 142. The scene data 142 characterizes the current state of the environment surrounding the vehicle 102 as of the current time point.

For example, the scene data can characterize, for all surrounding agents in the environment, a current state at the current time point and a previous state at one or more respective previous time points. In other words, the scene data can include, for all surrounding agents in the environment, data that characterizes a previous trajectory of the agent in the environment up to the current time point. The state of an agent at a time point can include the location of the agent at the time point and, optionally, values for a predetermined set of motion parameters at the time point. As a particular example, the motion parameters can include a heading for the agent, a velocity of the agent, and/or an acceleration of the agent. In some implementations, the scene data also includes data characterizing a current state of the vehicle at the current time point and a previous state of the vehicle at one or more respective previous time points. In some implementations, the scene data also includes data characterizing features of the environment. These features can include (i) dynamic features of the environment, e.g., traffic light states at the current time point, (ii) static features of the environment, e.g., road graph data characterizing one or more of lane connectivity, lane type, stop lines, speed limits, and so on, or (iii) both.

As a particular example, the scene data can be a three-dimensional data representation that characterizes the environment from a top-down perspective. In other words, the scene data can include one or more top-down rendered images of the environment for each time point that includes depictions of the surrounding agents in the environment at that time point. For example, the scene data can include a single top-down rendered image of the environment for each time point, where, in a top-down rendered image for a given time point, the surrounding agents can be depicted as bounding boxes in the top-down rendered images based on their locations and motion at the given time point. Bounding boxes are boxes of pixels in an image that identify the boundaries or edges of respective objects. In some implementations, the top-down rendered images also include additional rendered images for depictions of the road lanes and other road graph features or other features of the environment at the current time point.

The data representation system 140 provides the scene data 142 to a trajectory prediction system 150, also on-board the vehicle 102.

The trajectory prediction system 150 processes the scene data 142 to generate a respective trajectory prediction output 152 for each of one or more of the surrounding agents. The trajectory prediction output 152 for a given agent characterizes the future trajectory of the agent after the current time point.

More specifically, the trajectory prediction output 152 for a given agent includes data characterizing a predicted similarity of the future trajectory of the agent to each of a plurality of anchor trajectories. Each anchor trajectory characterizes a different possible future trajectory of the agent after the current time point and includes data specifying a sequence of multiple waypoint spatial locations in the environment that each correspond to a possible position of the agent at a respective future time point that is after the future time point. In other words, each anchor trajectory identifies a different sequence of waypoint locations in the environment that may be traversed by the surrounding agent after the current time point.

Generating the trajectory prediction outputs will be described in more detail below with reference to FIGS. 2 and 3.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the trajectory prediction outputs 152 generated by the trajectory prediction system 150 to one or more other on-board systems of the vehicle 102, e.g., the planning system 160 and/or a user interface system 165.

When the planning system 160 receives the trajectory prediction outputs 152, the planning system 160 can use the trajectory prediction outputs 152 to generate planning decisions that plan a future trajectory of the vehicle, i.e., to generate a new planned vehicle path. For example, the trajectory prediction outputs 152 may contain a prediction that a particular surrounding agent is likely to cut in front of the vehicle 102 at a particular future time point, potentially causing a collision. In this example, the planning system 160 can generate a new planned vehicle path that avoids the potential collision and cause the vehicle 102 to follow the new planned path, e.g., by autonomously controlling the steering of the vehicle, and avoid the potential collision.

When the user interface system 165 receives the trajectory prediction outputs 152, the user interface system 165 can use the trajectory prediction outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the trajectory prediction outputs 152 may contain a prediction that a particular surrounding agent is likely to cut in front of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To generate the trajectory prediction outputs 152, the trajectory prediction system 150 can use trained parameter values 195, i.e., trained model parameter values of the trajectory prediction system 150, obtained from a trajectory prediction model parameters store 190 in the training system 120.

The training system 120 is typically hosted within a data center 124, which can be a distributed computing system having hundreds or thousands of computers in one or more locations.

The training system 120 includes a training data store 170 that stores all the training data used to train the trajectory prediction system i.e., to determine the trained parameter values 195 of the trajectory prediction system 150. The training data store 170 receives raw training examples from agents operating in the real world. For example, the training data store 170 can receive a raw training example 155 from the vehicle 102 and one or more other agents that are in communication with the training system 120. The raw training example 155 can be processed by the training system 120 to generate a new training example. The raw training example 155 can include scene data, i.e., like the scene data 142, that can be used as input for a new training example. The raw training example 155 can also include outcome data characterizing the state of the environment surrounding the vehicle 102 at the one or more future time points. This outcome data can be used to generate ground truth trajectories for one or more agents in the vicinity of the vehicle at the time point characterized by the scene data. Each ground truth trajectory identifies the actual trajectory (as derived from the outcome data) traversed by the corresponding agent at the future time points. For example, the ground truth trajectory can identify spatial locations in an agent-centric coordinate system to which the agent moved at each of multiple future time points.

The training data store 170 provides training examples 175 to a training engine 180, also hosted in the training system 120. The training engine 180 uses the training examples 175 to update model parameters that will be used by the trajectory prediction system 150, and provides the updated model parameters 185 to the trajectory prediction model parameters store 190. Once the parameter values of the trajectory prediction system 150 have been fully trained, the training system 120 can send the trained parameter values 195 to the trajectory prediction system 150, e.g., through a wired or wireless connection.

Training the trajectory prediction system 150 is described in more detail below with reference to FIG. 4.

Figure 2:
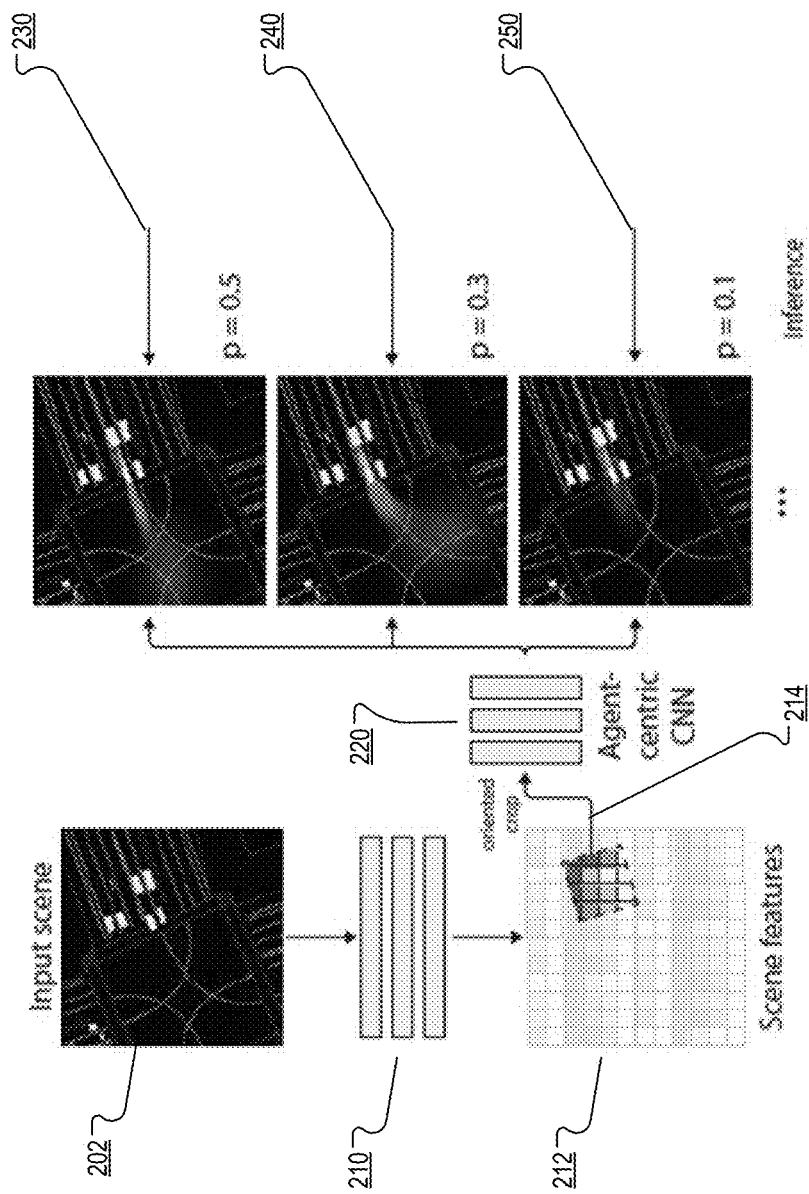
FIG. 2 is an illustration of generating a trajectory prediction for an agent.

FIG. 2 is an illustration of generating a trajectory prediction for an agent in a vicinity of a vehicle using an embedding neural network 210 and a trajectory prediction neural network 220. For example, the neural networks can be part of a trajectory prediction system, e.g., the trajectory prediction system 150 depicted in FIG. 1, on-board the vehicle.

The embedding neural network 210 receives input scene data 202 (also referred to as an embedding neural network input) which characterizes the current state of an environment surrounding a vehicle.

The embedding neural network 210 is a feedforward neural network that processes the scene data 202 to generate, as output, scene features 212 that encode the state of the individual agents in the scene and interactions between the agents. The scene features 212 are also referred to as an embedding neural network output.

For example, when the scene data 202 is a three-dimensional data representation that characterizes the environment from a top-down perspective, the embedding neural network 210 can be a convolutional neural network, i.e., a neural network that includes one or more convolutional neural network layers, and the scene features 212 can also be a three-dimensional data representation that characterizes the environment from a top-down perspective. For example, the scene data 202 and the scene features 212 can have the same spatial resolution but the scene features 212 can have a larger number of depth channels. As another example, the scene data 202 and the scene features 212 can have different spatial resolutions, with the scene features 212 having a larger number of depth channels. As a particular example, the embedding neural network 210 can have a ResNet architecture that includes multiple blocks of convolutional neural network layers that are each followed by a residual connection from the input of the block.

The system can then generate, from the scene features 212, a respective embedding for each agent in the vicinity of the vehicle for which a trajectory prediction should be generated. The embedding for an agent characterizes the agent up to the current time point.

To generate the embedding for an agent, the system performs an "oriented crop" 214 from the scene features 212. In particular, the system crops the portion of the scene features 212 corresponding to the agent and determines the embedding that characterizes the agent based on the cropped portion of the scene features 212. The portion of the scene features 212 that corresponds to a given agent can be, e.g., a fixed size portion of the scene features 212 that is centered at the location of the agent in the scene features 212. More specifically, the crop is referred to as an "oriented" crop because the system rotates the cropped portion of the scene features 212 to an agent-centric coordinate system to generate the embedding. For example, the system can perform this rotation using differentiable bilinear warping.

Because all of the embeddings for all of the agents of interest are generated from the scene features 212, the system can generate the embeddings for all of the agents of interest using only a single forward pass through the embedding neural network 210. That is, the embedding neural network input for a given agent characterizes not only the given agent but also further characterizes trajectories of one or more other agents in the environment up to the current time point and the embeddings for all of the agents can therefore be generated using a single forward pass through the embedding neural network 210.

To generate the trajectory prediction for a given agent, the system processes the embedding for the agent using the trajectory prediction neural network 220 (referred in FIG. 2 as the "Agent-centric CNN").

The trajectory prediction neural network 220 is a neural network that is configured to process the embedding to generate a trajectory prediction output that includes data characterizing a predicted similarity of the future trajectory of the agent to each of a plurality of anchor trajectories, i.e., to each of a fixed number of anchor trajectories.

Each anchor trajectory characterizes a possible future trajectory of the agent and includes data specifying a sequence of multiple waypoint spatial locations in the environment that each correspond to a possible position of the agent at a respective future time point. That is, each anchor trajectory defines a different possible future path through the environment that could be traversed by the agent after the current time point.

Generally, the anchor trajectories that are included in the fixed number are predetermined and represent a diverse set of possible behaviors that could be performed by an agent from any given current time. That is, the anchor trajectories are the same for all agents and are not dependent on the scene data 202 or any other information about the current scene in the environment. Because the anchor trajectories are also in the agent-centric coordinate system, the same set of anchor trajectories can be used for any agent no matter what the current position of the agent is in the current scene.

Generally, the anchor trajectories are predetermined prior to the training of the trajectory prediction system.

As a particular example, the system can determine some or all of the anchor trajectories based on the training set of agent trajectories that will be used to train the trajectory prediction system. For example, the system can cluster the trajectories in the training set into the fixed number of clusters and then select a representative trajectory from each cluster as an anchor trajectory.

As another example, the system can determine some or all of the anchor trajectories in the fixed number of anchor trajectories by uniformly sampling trajectories from the space of possible trajectories.

The example of FIG. 2 visualizes three anchor trajectories 230, 240, and 250 for an agent 222 characterized in the scene data 202. As can be seen from the example of FIG. 2, the trajectory prediction output has assigned a probability of 0.5 to trajectory 230, a probability of 0.3 to trajectory 240, and a probability of 0.1 to the trajectory 250, (with the remaining trajectories in the fixed number of anchor trajectories having a combined probability of 0.1). The probability assigned a given anchor trajectory can represent the likelihood that the given anchor trajectory will be the most similar anchor trajectory to the future trajectory of the agent.

In some implementations, the trajectory prediction output can also include, for each anchor trajectory, data characterizing, for each waypoint spatial location of the anchor trajectory, a probability distribution dependent on the waypoint spatial location. The probability distribution for a given waypoint spatial location defines respective likelihoods that the agent will occupy respective spatial positions in a vicinity of the waypoint spatial location at the future time point corresponding to the waypoint spatial location. That is, given that the agent follows the anchor trajectory, the probability distribution represents the space of predicted possible deviations from the anchor trajectory of the agent's actual future trajectory. In other words, for a given anchor trajectory, the probability distribution at a given future time point represents the space of possible deviations of the agent from the waypoint spatial location in the given anchor trajectory, with locations assigned higher probabilities being more likely deviations than locations assigned lower probabilities.

Thus, in these implementations, the trajectory prediction output includes K probabilities or other similarity scores, one for each of the K anchor trajectories. If each anchor trajectory includes T future time points, the trajectory prediction output also includes, for each of the K anchor trajectories and at each of the T future time points, data characterizing a probability distribution. Thus, if the data characterizing a probability distribution includes D values, then the trajectory prediction output for a given agent includes $K+K \times T \times D$ values.

In particular, for any given waypoint spatial location, the data characterizing the probability distribution dependent on the waypoint spatial location includes data defining parameters of a parametric probability distribution dependent on the waypoint spatial location.

As a particular example, the parametric probability distribution dependent on the waypoint spatial location can be a Normal probability distribution and the data defining the parameters of the Normal probability distribution can include (i) an offset parameter specifying an offset of a mean of the Normal probability distribution from the waypoint spatial location, and (ii) covariance parameters of the Normal probability distribution. For example, the covariance parameters can define a 2×2 covariance matrix in the agent-centric coordinate system. In this example, the trajectory prediction output includes a respective similarity score for each anchor trajectory, and for each future time point in each anchor trajectory, the trajectory prediction output can include five values: the mean offset along the x dimension, the mean offset along the x dimension, the mean offset along they dimension, three parameters that define the covariance matrix. Thus, the trajectory prediction output would include the K similarity scores and K×T×5 values that define the probability distributions at the future time points within the K anchor trajectories.

As another particular example, the covariance can be fixed, and the data defining the parameters of the Normal distribution at a given future time point can only include the offset parameter for the given future time point.

In the example of FIG. 2, the uncertainty defined by the probability distributions can be seen to be respecting the road geometry and growing for each of the trajectories over time.

The neural network 220 can include a set of convolutional layers that are configured to map the embedding to the K+K×T×D values that make up the trajectory prediction output. Alternatively, the neural network 220 can generate the probability distributions at the different future time points auto-regressively, i.e., by using one or more recurrent neural network layers or other auto-regressive neural network layers to map the output of the convolutional layers to the probability distribution parameters for each future time point in sequence.

Figure 3:
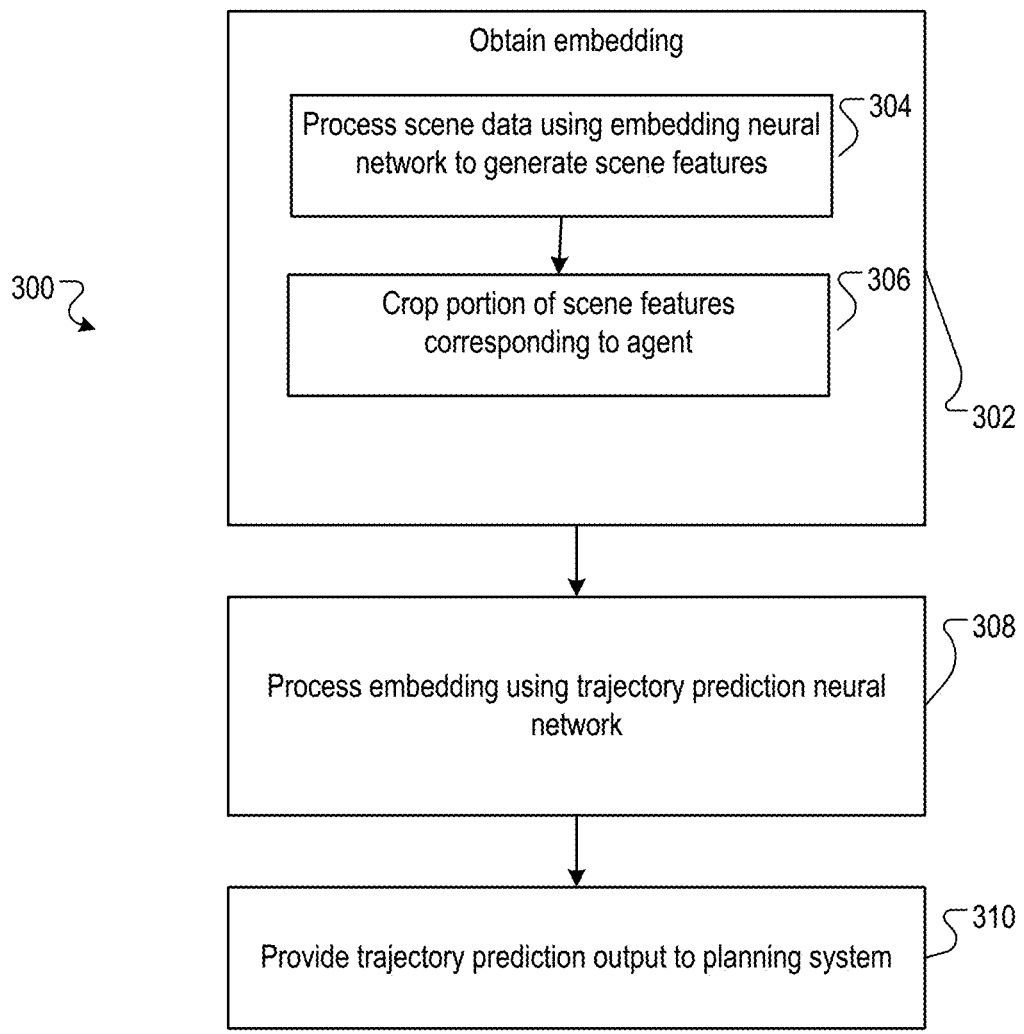
FIG. 3 is a flow diagram of an example process for generating a trajectory prediction output.

FIG. 3 is a flow diagram of an example process 300 for generating a trajectory prediction output for an agent in the vicinity of the vehicle. For convenience, the process 300 will be described as being performed by a system of one or more computers located in one or more locations. For example, a trajectory prediction system, e.g., the trajectory prediction system 150 of FIG. 1, appropriately programmed in accordance with this specification, can perform the process 300.

At any given time point, the system can perform the process 300 for each of one or more agents in the vicinity of the vehicle. For example, the system can perform the process 300 for each agent that has been identified as being in the vicinity of the vehicle by the sensor subsystem or for a proper subset of the identified agents, e.g., a proper subset of agents for which trajectory predictions are required by the planning system of the vehicle.

The system obtains an embedding that characterizes the agent in the vicinity of the vehicle in the environment up to the current time point (step 302).

For example, as described above, the system can obtain the embedding by processing scene data using the embedding neural network to generate scene features (step 304) and then cropping the portion of the scene features that corresponds to the agent to generate the embedding (step 306). In some cases, the system rotates the cropped portion of the embedding neural network to an agent-centric coordinate system in order to generate the embedding. As described above, the system can generate the embeddings for all of the one or more agents using only a single pass through the embedding neural network.

The system processes the embedding using a trajectory prediction neural network to generate a trajectory prediction output that characterizes a future trajectory of the agent after the current time point (step 308).

As described above, the trajectory prediction output includes data characterizing a predicted similarity of the future trajectory of the agent to each of the plurality of anchor trajectories. For example, the trajectory prediction output can include, for each of the anchor trajectories, a probability or other similarity score that represents the likelihood that the anchor trajectory will be the most similar trajectory to the future trajectory of the agent.

The trajectory prediction output can also include, for each anchor trajectory, data characterizing, for each waypoint spatial location of the anchor trajectory, a probability distribution dependent on the waypoint spatial location. The probability distribution for a given waypoint spatial location defines likelihoods that the agent will occupy respective spatial positions in a vicinity of the waypoint spatial location at the future time point corresponding to the waypoint spatial location in the anchor trajectory.

The system provides the trajectory prediction output to a planning system of the vehicle to generate planning decisions that plan a future trajectory of the vehicle (step 310).

Figure 4:
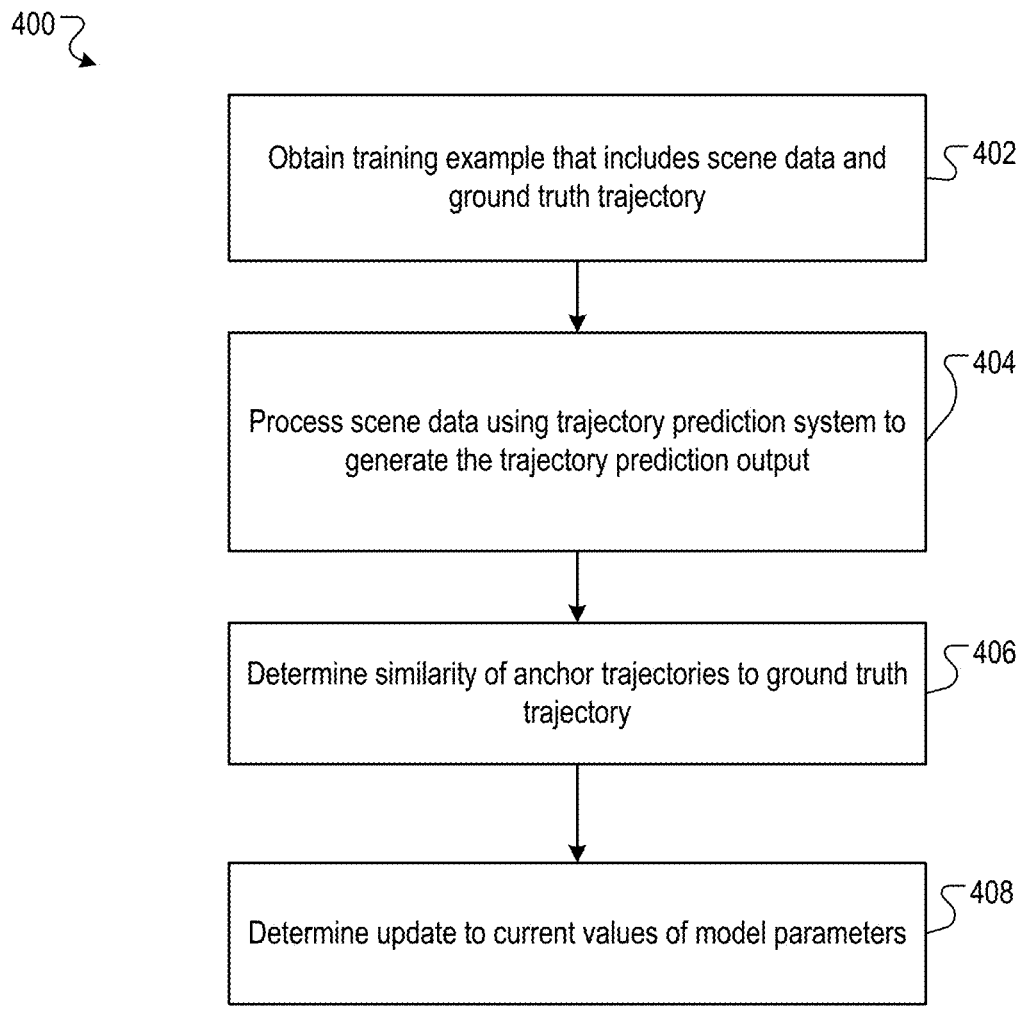
FIG. 4 is a flow diagram of an example process for training the trajectory prediction system.
Like reference numbers and designations in the various drawings indicate like elements.

FIG. 4 is a flow diagram of an example process 400 for training the trajectory prediction system. For convenience, the process 400 will be described as being performed by a system of one or more computers located in one or more locations. For example, a training system, e.g., the training system 120 of FIG. 1, appropriately programmed in accordance with this specification, can perform the process 400.

The system can perform the process 400 for each ground truth agent trajectory in a mini-batch of one or more ground truth agent trajectories sampled from a training set of ground truth agent trajectories to determine a respective model parameter update for each of the ground truth agent trajectory. The system can then combine, e.g., average or add, the respective model parameter updates to generate a combined update and then apply the combined update to the current values of the model parameters, e.g., in accordance with an optimizer being used for the training, e.g., the Adam optimizer, the rmsProp optimizer, or the stochastic gradient descent optimizer.

By repeatedly updating the model parameter values in this manner for different mini-batches of ground truth agent trajectories, the system can train the trajectory prediction system to generate accurate trajectory prediction outputs.

The system obtains a training example that includes scene data for an agent as of a first time point and a ground truth agent trajectory for the agent that identifies the actual trajectory followed by the agent after the first time point (step 402).

The system processes the scene data using the trajectory prediction system as described above and in accordance with the current values of the model parameters, i.e., in accordance with current values of the parameters of the embedding neural network and the trajectory prediction neural network, to generate a trajectory prediction output (step 404).

The system determines, for each of the anchor trajectories, a similarity of the anchor trajectory to the ground truth trajectory (step 406). For example, the system can compute the similarity between an anchor trajectory and a ground truth trajectory as the l2-norm distance or other appropriate distance measure in state-sequence space between the two trajectories.

The system determines an update to the current values of the model parameters by computing a gradient with respect to the model parameters of a loss function that is based on the similarities, the ground truth trajectory, and the trajectory prediction output (step 408). Because the system trains the embedding neural network and the trajectory prediction neural network jointly, the system can backpropagate gradients of the loss function through the trajectory prediction neural network and into the embedding neural network.

In some cases, the loss function employs a hard assignment between the ground truth trajectory and one of the anchor trajectories and therefore depends only on the anchor trajectory that is most similar to the ground truth trajectory. In these cases, the loss function can satisfy:

$$\Sigma_{k=1}^{K} 1(k=\hat{k}^m)[\log \pi(a^k|x^m; \theta) + \Sigma_{t=1}^{T} \log N(s_t^k|a_t^k + \mu_t^k, \Sigma_t^k; x^m; \theta),$$

where K is the total number of anchor trajectories, $\theta$ are the model parameters, $1(k=\hat{k}^m)$ is an indicator function that is 1 when the index k is the same as the index $\hat{k}^m$ of the most similar anchor trajectory to the ground truth trajectory and 0 whenever the index k is not the same as the index $\hat{k}^m$, $\pi(a^k|x^m; \theta)$ is the probability assigned to anchor trajectory k in the trajectory prediction output given the scene data $x^m$, T is the total number of time points in the anchor trajectories, $N(s_t^k|a_t^k + s_t^k, s_t^k; x^m; \theta)$ is the probability assigned to waypoint spatial location $s_t^k$ at time t in the ground truth trajectory by a Normal distribution having a mean that is $a_t^k + \mu_t^k$ and covariance parameters $\Sigma_t^k$, where $a_t^k$ is the waypoint spatial location at time t in the anchor trajectory k, $\mu_t^k$ is the offset of the mean of the Normal probability distribution from the waypoint spatial location at time t in the trajectory prediction output for anchor trajectory k, and $\Sigma_t^k$ covariance parameters for the waypoint spatial location at time t in the trajectory prediction output for anchor trajectory k.

In some other cases, the loss function employs a soft assignment between the ground truth trajectory and the anchor trajectories and therefore depends on all of the anchor trajectories, with the contribution to the loss of any given anchor trajectory being dependent on the similarity between the given anchor trajectory and the ground truth trajectory. In these cases, the indicator term in the loss function above would be replaced with a term that assigns a weight to anchor trajectory k that depends on the similarity between the anchor trajectory k based on the similarity between the trajectory k and the ground truth trajectory.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more data processing apparatus, the method comprising:
   obtaining an embedding that characterizes an agent in a vicinity of a vehicle in an environment up to a current time point;
   processing the embedding using a trajectory prediction neural network to generate a trajectory prediction output that characterizes a future trajectory of the agent after the current time point, wherein:
   the trajectory prediction output comprises data specifying, for each respective anchor trajectory of a plurality of anchor trajectories, a respective predicted similarity score that characterizes a likelihood that the respective anchor trajectory is, among the plurality of anchor trajectories, the most similar trajectory to the future trajectory of the agent; and
each anchor trajectory characterizes a possible future trajectory of the agent and comprises data specifying a sequence of multiple waypoint spatial locations in the environment that each correspond to a possible position of the agent at a respective future time point; and
providing the trajectory prediction output to a planning system of the vehicle to generate planning decisions that plan a future trajectory of the vehicle.

2. The method of claim 1, wherein the trajectory prediction output further comprises, for each of the plurality of anchor trajectories:
data characterizing, for each waypoint spatial location of the anchor trajectory, a probability distribution dependent on the waypoint spatial location that defines respective likelihoods that the agent will occupy respective spatial positions in a vicinity of the waypoint spatial location at the future time point corresponding to the waypoint spatial location.

3. The method of claim 2, wherein the data characterizing the probability distribution dependent on the waypoint spatial location comprises data defining parameters of a parametric probability distribution dependent on the waypoint spatial location.

4. The method of claim 3, wherein the parametric probability distribution dependent on the waypoint spatial location is a Normal probability distribution, and the data defining the parameters of the Normal probability distribution comprise (i) an offset parameter specifying an offset of a mean of the Normal probability distribution from the waypoint spatial location, and (ii) covariance parameters of the Normal probability distribution.

5. The method of claim 1, wherein the trajectory prediction neural network comprises one or more convolutional neural network layers.

6. The method of claim 2, wherein the trajectory prediction neural network comprises one or more recurrent neural network layers.

7. The method of claim 1, wherein obtaining the embedding that characterizes the agent in the vicinity of the vehicle in the environment up to the current time point comprises:
processing an embedding neural network input that characterizes a previous trajectory of the agent in the environment up to the current time point using an embedding neural network to generate an embedding neural network output;
cropping a portion of the embedding neural network output corresponding to the agent; and
determining the embedding that characterizes the agent based on the cropped portion of the embedding neural network output.

8. The method of claim 7, wherein the embedding neural network input further characterizes trajectories of one or more other agents in the environment up to the current time point.

9. The method of claim 7, wherein the embedding neural network input further characterizes: (i) dynamic features of the environment comprising traffic light states, and (ii) static features of the environment comprising one or more of: lane connectivity, lane type, stop lines, and speed limit.

10. The method of claim 7, wherein the embedding neural network input and the embedding neural network output each comprise a respective three-dimensional data representation that characterizes the environment from a top-down perspective.

11. The method of claim 7, wherein the embedding neural network comprises one or more convolutional neural network layers.

12. The method of claim 7, wherein determining the embedding that characterizes the agent based on the cropped portion of the embedding neural network output comprises:
rotating the cropped portion of the embedding neural network output to an agent-centric coordinate system.

13. The method of claim 1, wherein the anchor trajectories are predetermined.

14. The method of claim 13, wherein pre-determining the anchor trajectories comprises clustering agent trajectories from a training set of agent trajectories.

15. A system comprising:
one or more computers; and
one or more storage devices communicatively coupled to the one or more computers, wherein the one or more storage devices store instructions that, when executed by the one or more computers, cause the one or more computers to perform operations comprising:
obtaining an embedding that characterizes an agent in a vicinity of a vehicle in an environment up to a current time point;
processing the embedding using a trajectory prediction neural network to generate a trajectory prediction output that characterizes a future trajectory of the agent after the current time point, wherein:
the trajectory prediction output comprises data specifying, for each respective anchor trajectory of a plurality of anchor trajectories, a respective predicted similarity score that characterizes a likelihood that the respective anchor trajectory is, among the plurality of anchor trajectories, the most similar trajectory to the future trajectory of the agent; and
each anchor trajectory characterizes a possible future trajectory of the agent and comprises data specifying a sequence of multiple waypoint spatial locations in the environment that each correspond to a respective future time point; and
providing the trajectory prediction output to a planning system of the vehicle to generate planning decisions that plan a future trajectory of the vehicle.

16. The system of claim 15, wherein the trajectory prediction output further comprises, for each of the plurality of anchor trajectories:
data characterizing, for each of the waypoint spatial locations of the anchor trajectory, a probability distribution dependent on the waypoint spatial location that defines respective likelihoods that the agent will occupy respective spatial positions in a vicinity of the waypoint spatial location at the future time point corresponding to the waypoint spatial location.

17. The system of claim 16, wherein the data characterizing the probability distribution dependent on the waypoint spatial location comprises data defining parameters of a parametric probability distribution dependent on the waypoint spatial location.

18. One or more non-transitory computer storage media storing instructions that when executed by one or more computers cause the one or more computers to perform operations comprising:
obtaining an embedding that characterizes an agent in a vicinity of a vehicle in an environment up to a current time point;

processing the embedding using a trajectory prediction neural network to generate a trajectory prediction output that characterizes a future trajectory of the agent after the current time point, wherein:
  the trajectory prediction output comprises data specifying, for each respective anchor trajectory of a plurality of anchor trajectories, a respective predicted similarity score that characterizes a likelihood that the respective anchor trajectory is, among the plurality of anchor trajectories, the most similar trajectory to the future trajectory of the agent; and
  each anchor trajectory characterizes a possible future trajectory of the agent and comprises data specifying a sequence of multiple waypoint spatial locations in the environment that each correspond to a respective future time point; and
providing the trajectory prediction output to a planning system of the vehicle to generate planning decisions that plan a future trajectory of the vehicle.

19. The non-transitory computer storage media of claim 18, wherein the trajectory prediction output further comprises, for each of the plurality of anchor trajectories:
  data characterizing, for each of the waypoint spatial locations of the anchor trajectory, a probability distribution dependent on the waypoint spatial location that defines respective likelihoods that the agent will occupy respective spatial positions in a vicinity of the waypoint spatial location at the future time point corresponding to the waypoint spatial location.

20. The non-transitory computer storage media of claim 19, wherein the data characterizing the probability distribution dependent on the waypoint spatial location comprises data defining parameters of a parametric probability distribution dependent on the waypoint spatial location.

* * * * *